Nov. 15, 1966          F. N. KERSEY ETAL          3,285,441
                         DUMP CAR ASSEMBLIES
Filed July 28, 1964                              4 Sheets-Sheet 1

INVENTORS
FRANK N. KERSEY
JOHN L. KERSEY, JR.
TRENT H. KEMP
BY
                                    ATTORNEY

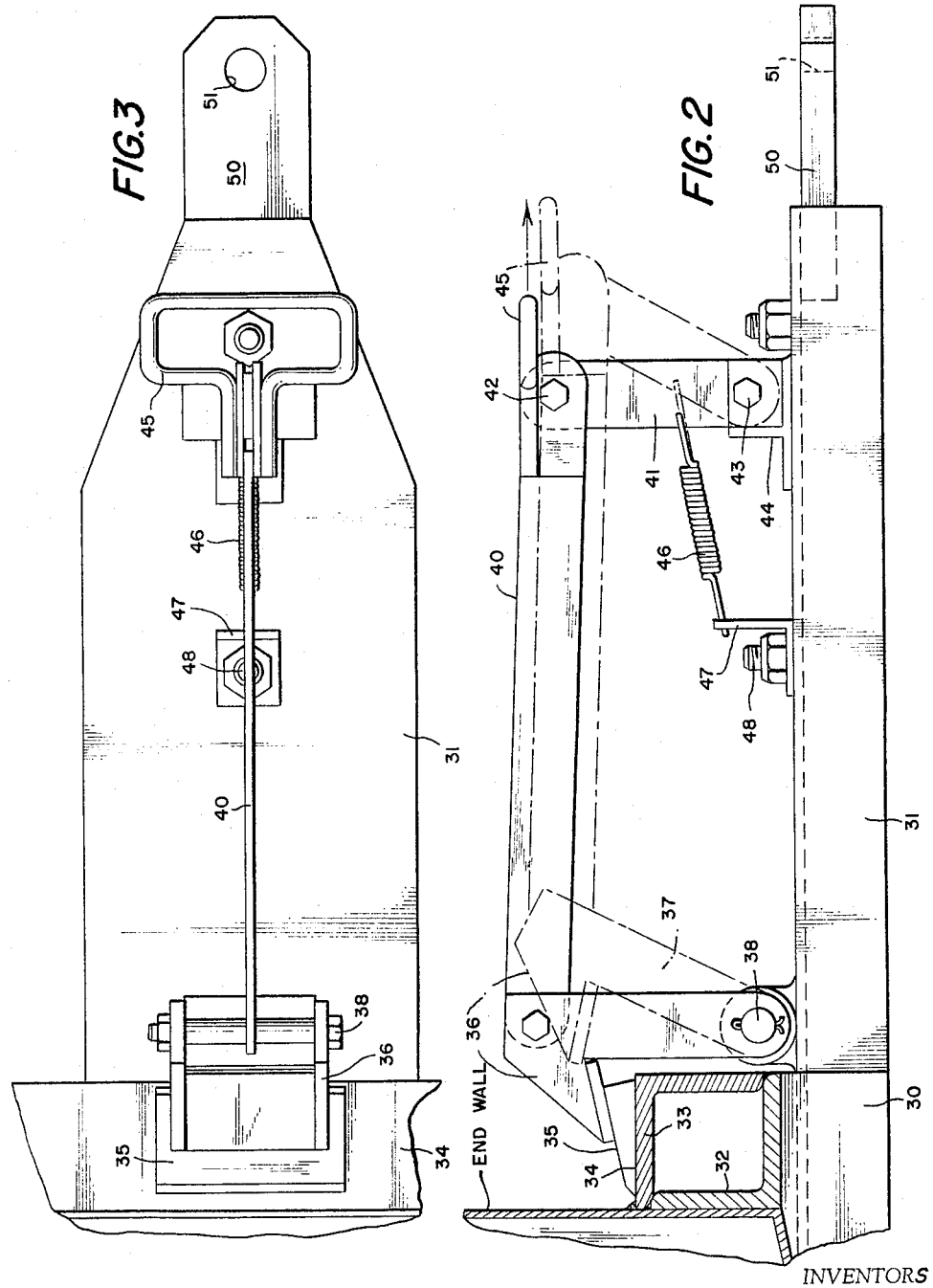

Nov. 15, 1966    F. N. KERSEY ETAL    3,285,441
DUMP CAR ASSEMBLIES
Filed July 28, 1964    4 Sheets-Sheet 3
FIG.4
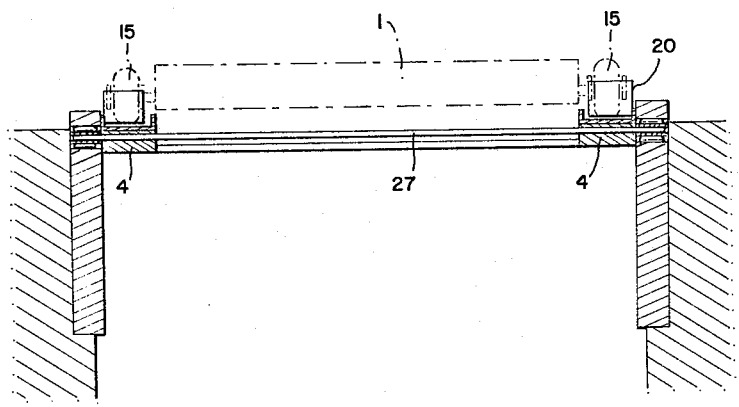
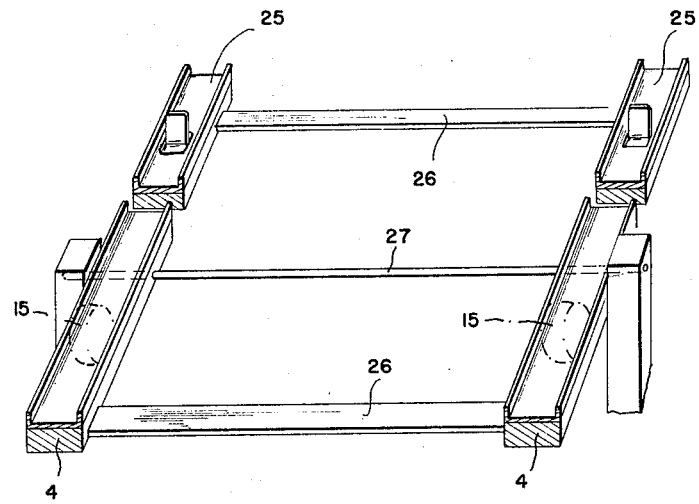
FIG.5
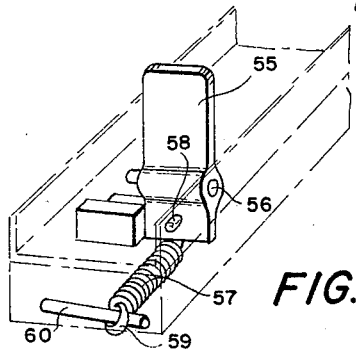
FIG. 6
INVENTORS
FRANK N. KERSEY
JOHN L. KERSEY, JR.
TRENT H. KEMP
BY Ralph L. Bassett
ATTORNEY Nov. 15, 1966　　F. N. KERSEY ETAL　　3,285,441
DUMP CAR ASSEMBLIES Filed July 28, 1964　　4 Sheets-Sheet 4

INVENTORS
FRANK N. KERSEY
JOHN L. KERSEY, JR.
TRENT H. KEMP

BY

ATTORNEY

United States Patent Office 3,285,441
Patented Nov. 15, 1966

3,285,441
DUMP CAR ASSEMBLIES
Frank N. Kersey, John L. Kersey, Jr., and Trent H. Kemp, Bluefield, Va., assignors to "Automatic" Sprinkler Corporation of America, Youngstown, Ohio, a corporation of Ohio
Filed July 28, 1964, Ser. No. 385,737
9 Claims. (Cl. 214—47)

This invention relates to a car dump assembly particularly for use in connection with trackless portable dump cars carried by a mine tractor, and including the use of resilient tires medially supported on torque rods.

One of the main objects of the invention is to provide an uncoupling arrangement for a trailer type car actuated from a mine tractor wherein the dumping operation can be performed without the necessity of uncoupling the loaded trailer.

A further object of the invention is to provide automatic positive means for tipping the loaded car as it is placed in a gravity or rocker type dump.

Another object of the invention is to provide means for shaking the car while in tilted position to insure complete unloading.

Another object of the invention is to provide positive means for automatically returning the car after the unloading operation to a horizontal position without the use of auxiliary tilting mechanism.

It is a further object of the invention to provide a manual means for unlocking the car when in loaded condition and automatic means for locking the car when it is returned from a dumping position.

Another object of the invention is to provide means for dumping a plurality of cars automatically and returning the same to a horizontal position automatically after the dumping operation, the dumping operation of the individual cars being controlled from the cab of the mine tractor.

Figure 1:
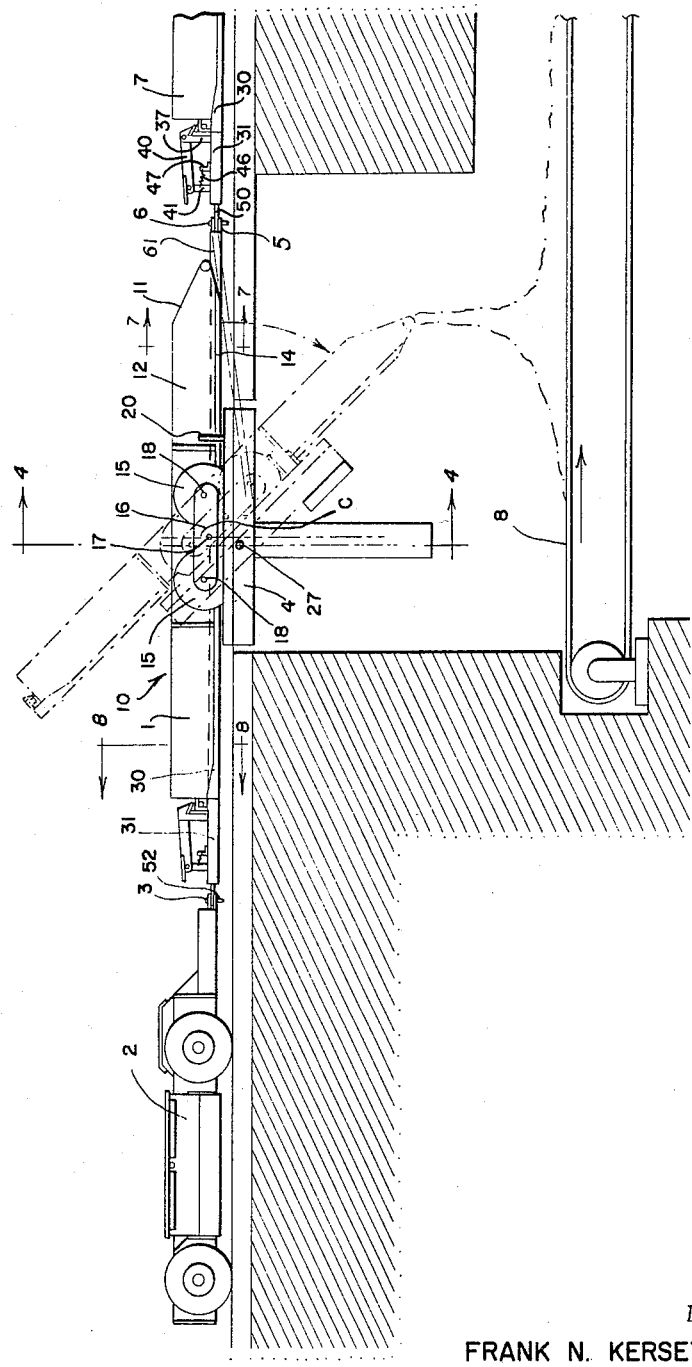
Figure 7:
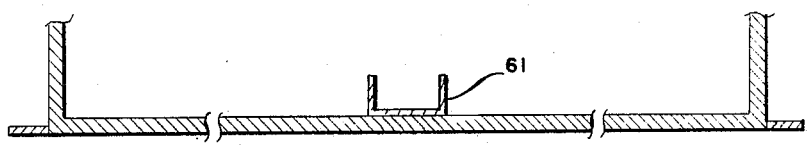
Figure 8:
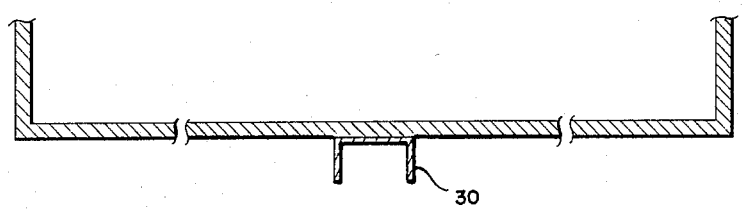
Figure 9:
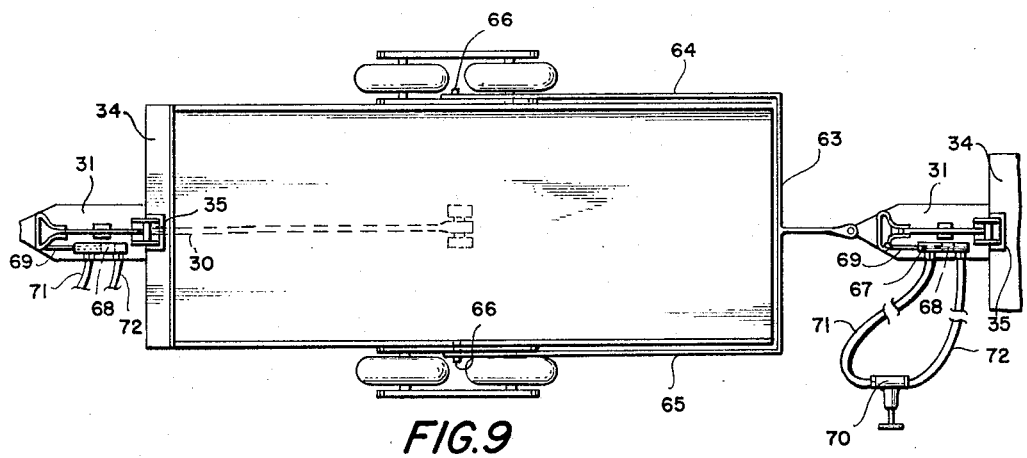

These and other objects of the invention will more clearly hereinafter appear by reference to the accompanying drawings forming a part of the instant specification and wherein like characters of reference designate corresponding parts throughout the several views in which:

FIG. 1 is a side elevation showing the dumping of a single car utilizing the present invention;
FIG. 2 is a side elevation of a lock mechanism;
FIG. 3 is a top plan view of the lock mechanism;
FIG. 4 is a transverse section through a dump assembly;
FIG. 5 is a perspective view of the dump assembly;
FIG. 6 is a perspective view showing the stop mechanism of the rocker type dump;
FIG. 7 is a transverse section on line 7—7 of FIG. 1;
FIG. 8 is a transverse section on line 8—8 of FIG. 1; and
FIG. 9 is a top plan view showing a modified form of draft mechanism.

FIG. 1 shows a dump car 1 incorporating the instant invention, illustrated in both loaded horizontal and unloaded tilted position. The car is shown coupled to the mine tractor 2 through a coupler 3. The car 1 is illustrated on a gravity or rocker type dump 4 and attached by coupler 5 to a second dump car 7. The car 1 is in position for dumping onto a conveyor belt 8. The car is of the general type shown in our copending application Ser. No. 317,874, filed October 18, 1963, now Patent No. 3,241,855, and includes a body 10 having an open or discharge end 11, side walls 12, and a bottom 14 formed of suitable floor sheeting. The car body 10 is mounted at each side upon spaced pairs of wheels 15 carried by a supporting plate or plates 16 mounted on torque rods 17 positioned as shown in a plane below the axles 18 of the wheels. This car mounting on torque rods is illustrated in our copending application Serial No. 317,874, now Patent No. 3,241,855. The side walls of the car are provided with stops 20 at each side of the wheel assembly.

The gravity or rocker dump, as shown in FIGS. 4 and 5, consists of a pair of U-shaped channels 25 connected by cross braces 26, the channels and their supporting structure being pivoted rearward of the longitudinal center at 27, as shown by center line C (FIG. 1), and normally held in a horizontal position for the reception of the dump car 1. The dump car 1 is adapted when under loaded condition to be moved by the mine tractor 2 to a position in which the center of the car, as indicated by the torque rods 17 which are located at the transverse center of the car, is past the pivot point 27 of the rocker dump 4. This will place the maximum weight of the load of the car and its lading beyond the pivot point of the rocker or gravity dump and cause the weight of the car to rotate the rocker dump 4 on its pivot 27 and shift the car to a downwardly inclined position, as shown in FIG. 1, where gravity will cause the discharge of the lading onto the endless belt 8 or other receiving means.

It will be obvious that with the car in the dump position shown in dotted lines in FIG. 1 that the mine tractor 2 can be moved forward and backward a slight distance which will cause a jogging or shaking of the car on the gravity dump and the complete discharge or unloading of the lading, which in some instances, as in the case of coal, may be inclined to adhere to the walls of the car due to moisture content and other reasons.

The draft bar 30 for the car 1 is coupled to the mine tractor by coupler pin 3, as shown in FIG. 1, and is preferably in the form of an inverted U-shaped channel. This draft bar 30 projects well beyond the adjacent end of the car and provides a horizontal portion 31 which forms a mounting for the car lock, as shown in FIGS. 2 and 3. The transverse end structure of the car adjacent the projecting draft bar 30 is provided with a pair of angles 32 and 33 arranged to form a box structure providing an upper surface 34 upon which is mounted an inwardly and downwardly sloping lock plate 35 which is adapted to be engaged by the downwardly and outwardly facing hook 36 which is pivoted by link 37 to pivot 38 mounted on the upper horizontal surface of the draft bar extension 31. The hook member 36 is connected to an elongated link 40 which extends rearwardly and is connected to a second vertically extending link 41 by a pivot 42, the bottom of the link being pivoted at 43 to the bracket 44 fixed to the upper surface of the draft bar extension 31 outwardly of the pivot 38. The elongated link 40 is provided with a handle 45 for manual movement of the hook 36 from locked to unlocked position. A spring 46 connects the vertical link 41 with the upstanding plate 47 fastened by the stud 48 to the upper surface of the draft bar extension 31, this spring normally urging the link 41 and the locking assembly towards locking position. The manual movement for releasing the lock would obviously be against the tension of the spring 46. The draft bar extension 31 has an integral outwardly extending portion 50 formed with an opening 51 for the reception of a coupler pin 3 for connecting the mine tractor with the car, as shown in FIG. 1.

Where a train is used, in lieu of a single car, and the various cars are unlocked by the mechanism shown in FIGS. 2 and 3, heretofore described, the release of the manually actuated lock may be by power means as by use of a solenoid, compressed air, or otherwise, and as is conventional in the operation of latches and locks. Where a train is used and the various cars are individually released as they are presented to the rocker dump, the individual cars could be operated from the mine tractor by the operator, it being apparent that the discharge of the individual cars is automatic and includes no manual function but depends upon gravity for the unloading operation. Upon a reverse movement of the tractor the car will swing back to its normal horizontal position due to the shifting or reversal of the pivot relation between the car and the rocker dump. Movement of the pivot point as provided by the torque rod 17 to the opposite side of the pivot point 27 of the rocker dump 4 and the shifting of the load will tend to return the car to a horizontal position. In addition, the impact of the moving mine tractor from rest to operative position will accelerate the return movement of the car from unloaded to loaded position because of the shift in weights due to the relative movement of the pivots of the related parts.

As shown in FIG. 6, stop means of any suitable form, such as the pivoted plate 55, may be provided in each of the channel trackways 25 of the rocker dump 4, these stops being adapted to engage the outwardly projecting stops 20 projecting at each side of the car structure to position the car on the dump and at one side of the dump pivot so that the automatic tilting of the car will take place. The pivoted stops 55 are mounted on pivots 56 and are normally positioned generally vertically by coil springs 57 one end of which is looped through an opening 58 in the bottom portion of the stop below the pivot 56 and the end 59 engages about a pin or projection 60. In lieu of the spring-urged stop shown in FIG. 6, stop mechanism of the same general type may be operated by fluid pistons or other automatic means and in this latter event would be controlled from any suitable source including the locomotive cab.

The draft bar 30 is positioned to project under the floor of the car (FIG. 9) as this draft bar which mounts the locking mechanism for securing the car in its horizontal position by the engagement of the hook 36 with the angle plate 35 is adapted when released to free the adjacent end of the car for upward movement, as shown in FIG. 1, i.e. when the lock mounted on the draft bar extension 31 is manually released, the car passing upon the rocker dump is free to swing upwardly clear of the draft mechanism to discharge its lading. On the other hand, the draft bar at the opposite or discharge end of the car, and indicated in FIG. 1 by reference character 61, is positioned on top of the floor of the car and moves upwardly through the lading when the car is tilted or as an alternate, as shown in FIG. 9, is in the form of a yoke having cross members 63, arms 64 and 65 pivoted to the pivot 66 fixed to the car structure. By having a draft structure at the discharge end of the car of yoke form, the car body is free to pass between the arms of the draft member for movement to discharge position, as shown in FIG. 1, to discharge its lading.

Inasmuch as the car body, when moved to its horizontal position, is locked in this horizontal position by the locking mechanism mounted on the draft bar extension 31 and shown in detail in FIGS. 2 and 3, there is no occasion for providing additional fastening means at the downwardly tilting end of the car structure.

In FIG. 9 there is illustrated power means for releasing the car lock arm 40 to free the car for swinging movement to unloading position. In this disclosure, a power cylinder 67 is shown mounted on the draw bar extension 31, including a piston 68 and operating rod 69, the latter being connected to the handle 45. Connected to the power apparatus or power cylinder 67 is a control valve 70 which may be mounted in the locomotive cab, this control valve by means of pipes 71 and 72 admitting compressed air to the power cylinder to cause the rod 69 to actuate the lock arm 40.

In lieu of the power cylinder 67 it will be obvious that an electro-magnet or other source of power may be used to release the lock mechanism shown in FIGS. 2 and 3 to free any one or all of the car bodies as they are positioned over the rocker dump and tilted. By this means a train of cars embodying the present concept can be moved by a single locomotive successively to discharge position and released from the cab by a single operator.

It will be understood that the stops which are provided on the gravity or rocker dump may be automatically shifted into position during the unloading operation to engage the guards or stops on the car and in cooperation with the stops on the car materially facilitate the provision of impact to the dump car for loading, unloading and clearing by shifting the mine tractor a short distance forward and backward as is customary in this art.

What is claimed is:

1. In a pivoted dump car assembly, a car body having medially arranged pivots at a transverse axis and having a floor, side walls and one end wall, said car body being open at one end for discharge of lading, mounting means for said body comprising a pair of wheels at each side of said car, each pair of wheels being mounted on a supporting structure and the supporting structure being fixed to the end of a torque rod extending transversely beneath the car body medially of the length thereof, whereby said wheels will compensate for irregular track surfaces, front and rear draft bars for said car, each bar being pivoted at its inner end to the car body adjacent said transverse axis, one of said draft bars being positioned beneath said car body and projecting outwardly therefrom and including a platform and a coupler, locking means mounted on said platform, means urging said locking means into position to engage a projecting part of said car body to secure the same in horizontal position upon said draft bar, said other draft bar being positioned out of the path of movement of the tilting car body, and means for supporting and tilting said car body for discharging the lading out of its open end.

2. In a dump car assembly, a car body having medially arranged pivots for end lading discharge, wheels and axles mounting said car body, said car including a bottom, side walls and one end wall, front and rear draft bars for said car body, said front draft bar being positioned beneath the car floor and being pivoted at its inner end under the car body and extending outwardly beyond the car body at its other end, said projecting portion of said front draft bar including a platform and a coupler, a pivoted locking means mounted on said platform having a hooked end portion for engaging a portion of the car body to retain the car body in horizontal position, means for disengaging the hook member from engagement with the car body to permit the same to swing on its medial pivot for the discharge of lading through its open end, a second draft bar pivotally connected to the car body and positioned out of the path of movement of the car body when the latter swings on its pivot to discharge lading, and a gravity or rocker dump arranged in the path of movement of said car, said rocker dump including pivot members and stop members, said stop members being adapted to engage the car body body after the car pivots have moved beyond the pivots of said dump.

3. The structure of claim 2 characterized in that the car body is provided with stop means to position the car body with maximum load at one side of said pivots of said rocker dump.

4. In a dump car assembly, a car body having medially arranged pivots at a transverse axis for end lading discharge, wheels and axles mounting said car body, said car including a bottom, side walls and one end wall, front and rear draft bars for said car body, said front draft bar being positioned beneath the car floor and being pivoted at its inner end to said car body adjacent said transverse axis and extending outwardly beyond the car body, said projecting portion of said front draft bar including a platform, a pivoted locking means mounted on said platform having a hooked end portion for engaging a portion of the car body to retain the car body in horizontal position, means for disengaging the hook member from engagement with the car body to permit the same to swing on its medial pivot for the discharge of lading through its open end, a second draft bar pivotally connected to the car body adjacent said transverse axis and positioned above the car floor out of the path of movement of the car body when the latter swings on its pivot to discharge lading, and coupling means for said draft bars.

5. The structure of claim 4 characterized in that the pivoted locking means mounted on the platform includes an upwardly extending pivoted link terminating in a downwardly facing hook, said link being connected to a second pivoted link by a third link member terminating in a handle.

6. The structure of claim 4 characterized in that the locking means comprises a pivoted link terminating at its upper end in a downwardly facing hook and link means are connected to said hook including a spring normally urging said hook towards locking position.

7. The structure of claim 4 characterized in that the end of the car is formed with a box structure having mounted upon its upper face an inclined plate adapted to engage an inclined face carried by a lock member mounted on said platform.

8. the structure of claim 4 characterized in that power means are provided for operating said locking means.

9. The structure of claim 4 characterized in that the pivoted locking means mounted on the platform is operated by remotely controlled power means.

References Cited by the Examiner
UNITED STATES PATENTS

| | | | |
|---|---|---|---|
| 1,120,358 | 12/1914 | Aygarn | 214—49 |
| 2,770,491 | 11/1956 | Perko | 298—17 X |
| 2,868,583 | 1/1959 | Harbers et al. | |

MARVIN A. CHAMPION, *Primary Examiner.*

ROBERT G. SHERIDAN, *Examiner.*